United States Patent [19]

McEathron

[11] Patent Number: 4,537,609
[45] Date of Patent: Aug. 27, 1985

[54] STONE TRAP AND METHOD OF USING FOR MAKING GLASS FIBERS

[75] Inventor: Eugene D. McEathron, Butler, Pa.

[73] Assignee: PPG Industries, Inc., Pittsburgh, Pa.

[21] Appl. No.: 616,864

[22] Filed: Jun. 4, 1984

[51] Int. Cl.³ .......................................... C03B 37/085
[52] U.S. Cl. .................................. 65/1; 65/2; 210/306
[58] Field of Search .................. 65/1, 2; 210/305, 306, 210/519, 456

[56] References Cited

U.S. PATENT DOCUMENTS

| 276,179 | 4/1883 | Haynes | 210/456 X |
|---|---|---|---|
| 1,677,324 | 7/1928 | Beck et al. | 210/305 X |
| 1,793,510 | 2/1931 | Raymond | 210/519 |
| 2,009,061 | 11/1937 | Gordon | 210/305 X |
| 2,360,373 | 10/1944 | Tiede . | |
| 3,164,458 | 1/1965 | Mitchell . | |
| 3,401,536 | 9/1968 | Glaser . | |
| 3,556,753 | 1/1971 | Glaser | 65/2 |
| 3,837,823 | 9/1974 | Shealy . | |

FOREIGN PATENT DOCUMENTS 632507 12/1961 Canada .................................. 65/1

Primary Examiner—Robert Lindsay
Attorney, Agent, or Firm—John E. Curley

[57] ABSTRACT

Fiber glass forming bushings are described which contain baffle arrangements which are positioned below the bushing flange and direct glass flows inside the bushing to trap stones in the molten glass. The baffles are arranged to divert glass entering the bushing in inward and upward directions to give the stones ample time to settle on the baffles before the glass reaches the bushing orifices.

13 Claims, 5 Drawing Figures

STONE TRAP AND METHOD OF USING FOR MAKING GLASS FIBERS

The present invention relates to the manufacture of glass fibers. More particularly, the present invention relates to methods of operating fiber glass forming bushings used in a direct melt fiber glass forming process and to novel fiber glass forming bushings.

BACKGROUND OF THE INVENTION

In the modern manufacture of glass fibers, a method of manufacture known as the direct melt method is employed. In this method of preparing glass fibers, the glass batch ingredients in powdered or granular form are introduced into a furnace and melted. The molten glass resulting from the melting operation is passed from the furnace through a refining section to elongated forehearths. Fiber glass forming bushings located below the forehearths are attached at many points along the length of the forehearth to provide positions along the forehearth from which various fiber glass products are formed. In FIG. 3 of U.S. Pat. No. 3,837,823, a diagramatic illustration of a melter, refiner and forehearth with bushing openings is shown. In the same U.S. patent, the typical bushing connection to forehearth refractories is also shown.

As will be appreciated, glass batch ingredients which are melted in the furnace in a direct melt operation travel a considerable distance in passing through the furnace, the refining section and the elongated forehearths from which the various fiber forming bushings depend. The furnace itself, the refiners and the forehearths are all lined with refractories that are typically constructed of high temperature resistant materials such as chrome oxides and zircon materials. During the course of a furnace campaign which can last from 3 to 6 years, the molten glass passing over the refractories contained in the melting chambers, refiners and forehearths are subject to erosion and attack by the molten glass which frequently introduces particles of the refractories into the glass melt and they ultimately reach the bushings. These refractory particles, being extremely high temperature resistant refractories, are difficult to melt and therefore, find their way into the fiber forming bushings as solid particles.

The fiber forming bushings utilized to produce the glass fibers are generally rectangular vessels. These bushings are fabricated from precious metals or precious metal alloys such as platinum or platinum-rhodium alloys. Characteristically the bushings have four sides and a bottom on which are positioned a plurality of nozzles or tips through which the molten glass fed to the bushing emanate to form individual streams of molten glass. These streams of molten glass are formed into fibers as the molten glass exits the bushing. The bushings are also characteristically open at the top and contain a side flange around the perimeter of the bushing which is utilized to attach the bushing to the refractories contained in the forehearth opening.

Any refractory particles present in the molten glass, known in the art as stones, enter the bushing in a flowing column of glass from the forehearth and are carried down into the bushing bottom where, if the stones are of sufficient size, they plug up the nozzles or tips causing a break out of the bushing position. If several nozzles or tips of a bushing become clogged with unmeltable, solid, refractory particles the number of filaments produced at a given bushing is subsequently reduced and an unsatisfactory product is then obtained from that bushing.

In a typical fiber glass operation, the filaments formed by the exit of molten glass at the bushing tips or nozzles are passed over an applicator which applies a desired chemistry to the glass surfaces, they are then gathered into a strand form by passing them through a grooved gathering shoe. The strand is then collected usually on a winder. In some instances, the glass being drawn by the collecting device is chopped into discrete lengths utilizing a chopper rather than a winder. In any event, if particulates of refractories block or clog the bushing nozzles or tips, the bushing position becomes unsatisfactory for the production of a particular type of strand since it will not have the required filament count or the bushing itself will flood in the areas of the clogged tips. Ultimately flooding will involve other nozzles or tips that are still running and eventually the bushing position will no longer function properly. This will require a shut-down of the bushing position for replacement of the bushing.

Thus, a need exists in the art to insure in a direct melt operation that unmelted refractory particles that would normally interfere with a bushing nozzle or tip are eliminated before such materials reach the bushing bottom or faceplate as it is known in the art so that they do not clog the openings for the nozzles and tips contained in the bottom of the bushing and/or interfere with glass flow from the bushing.

THE PRESENT INVENTION

In accordance with the instant invention, a process for feeding molten glass into the confines of the fiber glass forming bushing utilized in a direct melt furnace is provided which minimizes or eliminates interference in a fiber forming bushing operation caused by unmelted refractory particles or stones. In another aspect, the invention involves the construction of novel bushings which permit the utilization of these bushings in a direct melt furnace to substantially eliminate problems associated with refractory materials entering the bushing proper in the molten glass source coming from a direct melt furnace, refiner and forehearth.

The instant invention therefore involves passing the molten glass from the forehearth to the bushing in the normal manner as a column of glass entering the bushing top and passing below the bushing flange toward the bushing bottom. This first stream of molten glass entering the bushing is divided by suitable baffling internal to the bushing and below the flange so that the glass stream is divided into two distinct streams. One portion of the stream so divided is passed downwardly toward the bushing bottom while the other stream is forced into an abrupt change of direction so that it flows continuously but has its downward direction changed to one having an upward slope to it. Thus, the continuous glass stream flowing through the bushing is divided into two distinct streams, one of which is interrupted in its downward direction and is passed upwardly from a baffle surface and over a barrier formed by the baffle where it then mixes with the remaining glass flowing downwardly toward the bushing bottom. The other half of the glass stream which was separated by the first baffle and the diverted glass, then flow together with the diverted stream to a second zone where the glass stream is subjected to a second interruption in its downward flow to the bushing floor and is caused to flow upwardly again by means of a baffle arrangement so that it must flow again over a barrier. Its direction is then changed again into a downward flow prior to reaching the bushing floor. At the point of interruptions and change of direction, stones of unmelted, refractory particles are, because of their higher density than the molten glass, caused to leave the glass stream by settling and are collected on the baffle members below the level of the barriers formed by the baffles over which the glass flows. Operating in this fashion, the molten glass is subjected to rapid deflections in its course of direction, the stones leave the glass material and are trapped by the sidewalls of the baffling arrangement, and all within a short distance since all of the baffling is contained within the bushing below the bushing mounting flange.

The bushings utilized to provide the necessary baffling to conduct the instant process, have baffle arrangements inside and below the bushing flange which insure that the glass will be subjected to at least two abrupt changes in flow. Thus, the baffles run the length of the bushing along the sidewalls or the center of the bushing as the case may be as will be more fully described hereinafter in connection with the drawings. One of the unique features of the instant invention is that the baffles of the bushings can be constructed in such a manner that the baffles can be inserted into the bushing without the necessity of having to be welded to the bushing sidewalls. While welding of the baffles to the bushing sidewalls can be utilized, it is preferred that the inserts be utilized without any welding of the structures to the sidewalls of the bushing since excessive welding on bushing sidewalls tends to disturb the heat patterns normally associated with these fiber glass forming bushings. Bushings, of course as it is well known in the art, are electrically heated to maintain the glass in a molten condition while the glass fibers are being formed at the nozzles or tips and disruption of the heat input to a bushing is undesirable.

BRIEF DESCRIPTION OF THE DRAWINGS

The invention will now be discussed with reference to the accompanying drawings in which.

DETAILED DESCRIPTION OF THE DRAWINGS

Figure 1:
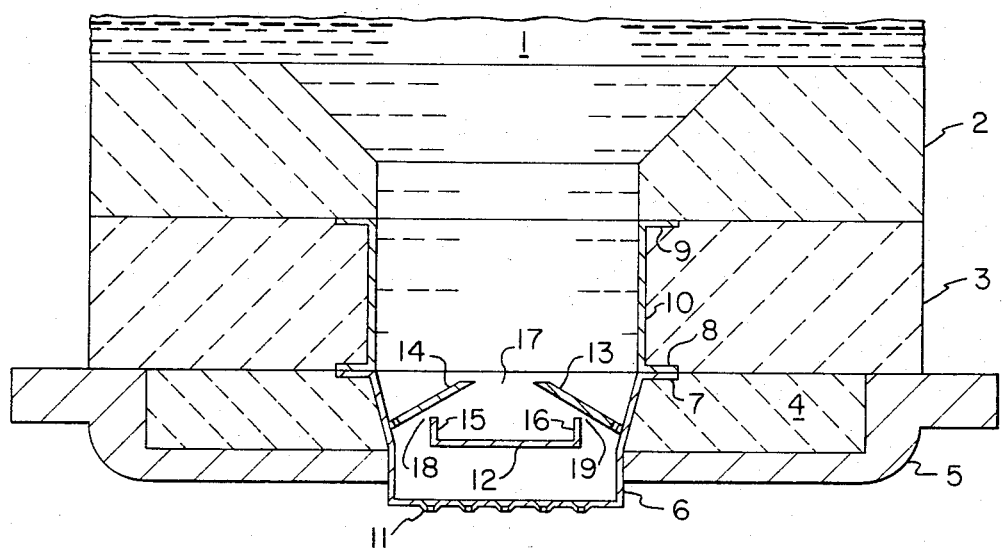
FIG. 1, in side elevational view of one embodiment of bushing of the instant invention.

Turning to the drawings in more detail and to FIG. 1 in particular, there is shown one embodiment of the instant invention.

In this embodiment, a forehearth is shown indicated generally as 1 and is shown filled with molten glass. The forehearth has a flowblock 2 associated with the floor of the forehearth, the flowblock being sloped downwardly to assist the molten glass contained in the forehearth in its flow toward the bushing 6. Below the flowblock 2 is a bushing block 3 which has a platinum liner 10 associated therewith. The platinum liner 10 is U-shaped so that two flanges 8 and 9 are provided to interface between the flowblock 2, the bushing block 3 and the bushing flange 7 of the bushing 6. The bushing 6 is carried by a frame member 5 usually constructed of cast iron or bronze and is surrounded by a ceramic insulator 4 which can be a solid ceramic or preferably a castable refractory such as described in U.S. Pat. No. 3,164,458. The bushing flange 7 holds the bushing to the castable refractory 4 and is contacted when in place with the flange 8 of the bushing block liner 10. Suitable bolts and nuts not shown in the drawing are used to fasten the bushing frame 5 to the block 3 in a manner well known to those skilled in the art.

As shown in the drawing, below the level of the flange member 7 of the bushing 6 are a series of baffle members. The upper baffle in the horizontal plane consists of elements 14 and 13. Baffles 13 and 14 which are identical in construction are sloped upwardly and inwardly with their inner edges forming an opening 17 in the center of the bushing 6. These baffles are constructed preferably of platinum or platinum-rhodium alloy and they extend the length of the bushing. At both ends, the baffles, 13 and 14 have end walls, (now shown), which are sloped upwardly and inwardly and enclose the ends of baffles 13 and 14, thus, preventing glass flowing from the forehearth from reaching the bushing bottom except through the opening 17.

Located below the baffles 13 and 14 is a U-shaped baffle member 12 which is characterized by having a flat plate bottom and two sidewalls 15 and 16 on either side thereof. Again, this baffle 12 runs the entire length of the bushing and is closed at both ends to prevent glass flow from entering the bushing bottom except by flowing over the upper extremeties 15 and 16 of the baffle 12. Located in the bottom of the bushing are a plurality of nozzles 11, through which the molten glass flows to form the glass fibers. The cooperative arrangement of the baffle member 12 and the two baffle extremeties or sides 15 and 16 provide with the outside of baffles 13 and 14 passageways 19 and 18 respectively through which glass flows from the surface of the baffle 12 to the bushing bottom and orifice 11.

Thus, molten glass flowing from the forehearth 1 to the bushing nozzle 11 passes downwardly along the sides of the linear 10 on bushing block 3 and into the central opening 17 created by the arrangement of baffles 13 and 14. A portion of the glass stream flowing from the flowblock and towards the bottom of the bushing is thereby divided so that it strikes the surface of the baffles 13 and 14 and has its direction diverted to an upward and inward direction prior to reaching the baffle member 12. All glass hitting the baffle member 12 is diverted outwardly and upwardly and over the sides 15 and 16 of the baffle 12 and passes through the narrow openings 18 and 19 prior to reaching the floor of the bushing where the nozzles 11 are positioned.

Figure 2:
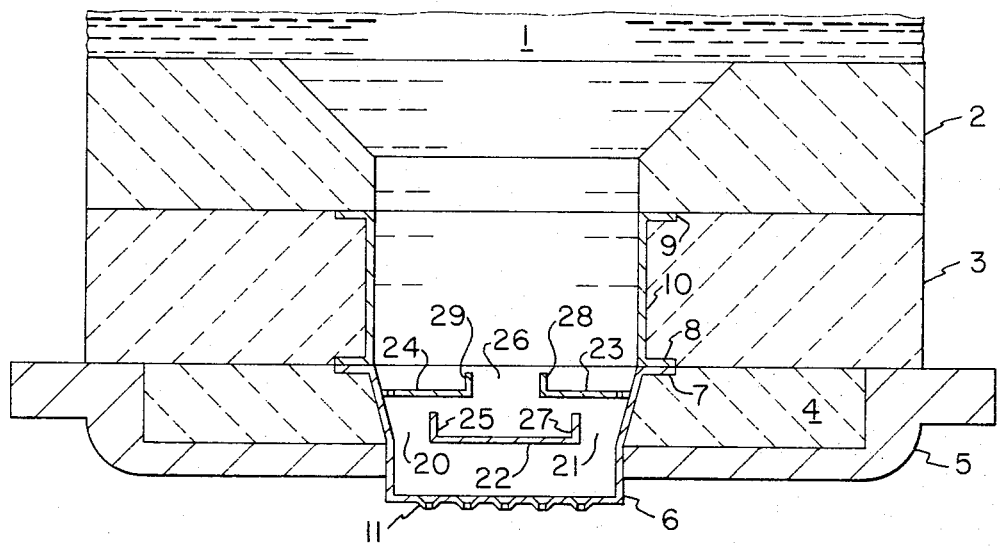
FIG. 2 is a side elevational view of another embodiment of a bushing of the instant invention.

In FIG. 2, a second arrangement of baffles is shown. The forehearth 1, flowblock 2 and bushing block 3 arrangements with their associated liners are essentially the same as FIG. 1. Bushing 6, like the bushing in FIG. 1 also is provided with a flange member 7. In the embodiment of FIG. 2, two baffle members 23 and 24 are provided on the upper portion of the bushing 6 and below the flange 7 and have sidewalls 28 and 29 respectively associated therewith. The baffles 23 and 24 effectively divide the glass flowing from the forehearth to the bottom of the bushing into two distinct streams, one of which enters directly through opening 26 created by the sides 28 and 29 of baffles 23 and 24, to the bottom of the bushing. The glass flowing down the sides of the liner 10 strike the baffles 23 and 24 on either side and is forced inwardly and upwardly over the sides 28 and 29 of the baffles 23 and 24. This diverted glass then passes downwardly through opening 26 to a second baffle member 22 located immediately below the opening 26. Baffle member 22 has two sides, 25 and 27 associated therewith so that all glass striking the baffle 22 must pass outwardly and upwardly to reach the bushing bottom and nozzle 11. This glass is passed to the bottom of the bushing through narrow openings 20 and 21 formed by the floors of baffles 23 and 24 and the upper sides 25 and 27 of baffle 22. Thus, glass passing from the forehearth to the bottom of the bushing is divided into two distinct streams, one stream flowing centrally down through opening 26 and the other stream flowing inwardly and upwardly over the sides 28 and 29 of baffles 23 and 24 before entering the stream of glass passing down through the opening 26. The combined glass is then passed to the baffle member 22 where it is passed outwardly and upwardly over the extremities 25 and 27 of baffle 22 through the narrow openings 20 and 21 to the bottom of the bushing and nozzle 11.

Figure 3:
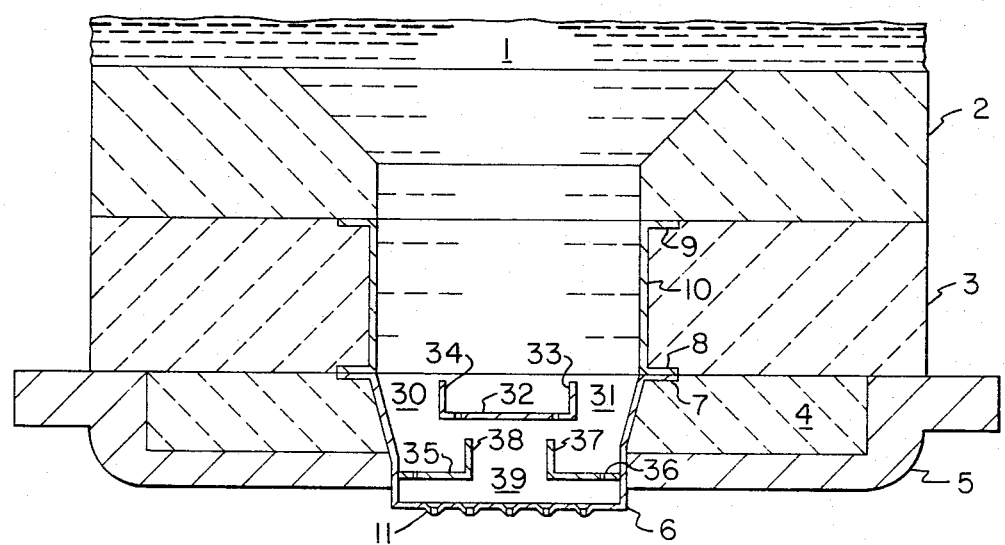
FIG. 3 is a side elevational view of a another embodiment of a bushing connected to the instant invention.

In FIG. 3, a further embodiment of the instant invention is described in which a U-shaped baffle 32 is positioned in the central area of the bushing and all glass passing from the forehearth to the bushing bottom at the central portion of the opening defined by the flowblock 2 and bushing block 3, strikes the surface of baffle 32 and must pass outwardly and upwardly over the sides 33 and 34 of baffle 32. The glass passing down the sides of the opening provided by the flowblock 2 and bushing blocks 3 passes through the openings 30 and 31 and strikes an L-shaped baffle 35 on one side of the bushing and an L-shaped baffle 36 on the other side of the bushing. Baffle 35 is provided with side 38 and baffle 36 with a side 37. Glass striking the surface of the baffles 35 and 36 must therefore pass inwardly and upwardly over the sides 38 and 37 of baffles 35 and 36 respectively to a central opening 39 formed by the arrangement of the sides of these baffles and the bottom of baffle 32. Thus, all glass passing from the forehearth to the bushing bottom is subjected to at least two changes in direction from a downward flow to an upward flow prior to reaching the bushing floor and nozzle 11. As in the other embodiments, the ends of baffle 32, 38 and 37 were closed so that glass must pass throughh the opening 30, 31 and 39 in its passage to nozzle 11.

Figure 4:
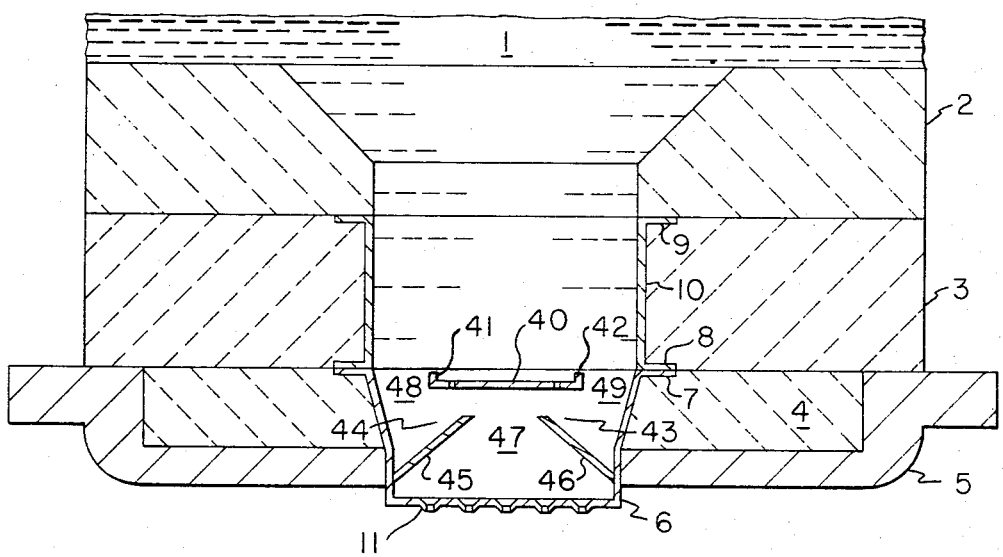
FIG. 4 is a side elevation of still another embodiment of a bushing of the instant invention.

In FIG. 4 a further embodiment of the instant invention is shown in which the baffling arrangement is such that the glass passing from the forehearth downwardly toward the bushing bottom is intercepted by baffle 40, which is U-shaped with sides 41 and 42 provided thereon. The glass passing down the center portion of the bushing is interrupted by the baffle 40 and is forced outwardly and upwardly over the sides 41 and 42 of the baffle 40 and through narrow openings 48 and 49 in its passage to the bottom of the bushing 6. The glass passing down the sidewalls formed by the flowblock 2 and bushing block 3 passes directly into the openings 48 and 49 is admixed with the glass passing over the sides 41 and 42 of baffle 40. This glass in its downward travel is interrupted by a sloped baffle member 45 on one side and a similar baffle 46 on the other side. All of the glass striking baffles 45 and 46 is therefore forced inwardly and upwardly over the baffle members 45 and 46 respectively and through narrow openings 43 and 44 formed by the arrangement of baffles 45 and 46 with the bottom baffle 40. The glass then passes through opening 47 formed by the sides of baffles 45 and 46 to the bushing bottom. As in the other embodiments described, the ends of the baffles 40, 45 and 46 were closed so that the glass is forced to pass through openings 47, 48 and 49 in its travel downwardly to nozzle 11.

Figure 5:
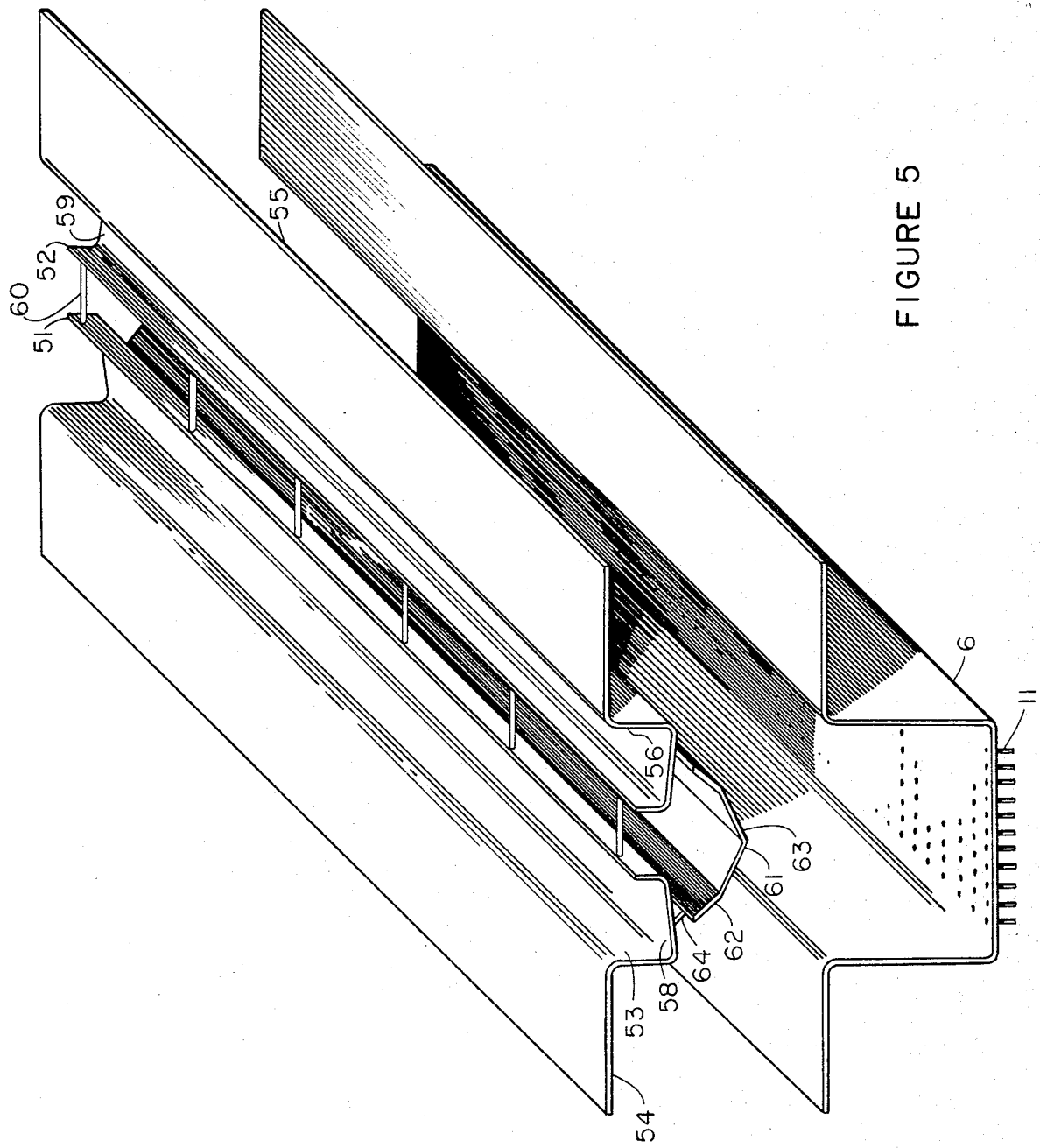
FIG. 5 is a view in perspective of a further embodiment of a bushing of the instant invention.

In FIG. 5, a view in perspective of a typical bushing arrangement in accordance with the invention is shown. A baffle arrangement similar to that shown in FIG. 2 is depicted in this figure. This figure illustrates the insertability of the baffle arrangements of the instant invention as a simple insert requiring no welding of the baffles to the bushing sidewalls. For clarity in showing this, the associated ceramics have not been shown, but it should be understood that the bushing would be mounted in a forehearth opening in a manner similar to the mountings shown in FIGS. 1-4 hereinabove discussed.

The bushing 6 shown in the drawing with its nozzles 11 is again provided with a flange 7. In this embodiment, two L-shaped baffles 58 and 59 are shown. Baffle 58 is formed from an integral piece of precious metal such as platinum or platinum-rhodium alloy and is provided with an inside wall 53 and a flange member 54 which is coextensive with the flange 7 of the bushing 6. Similarly, wall 56 and flange member 55 are provided on baffle 59. Stiffening members 60 are provided between the free ends 51 and 52 of the baffles 58 and 59 respectively, to provide stiffness to the opening formed by the sides 51 and 52 of the baffles 58 and 59. These stiffening members 60 prevent the free ends 51 and 52 from collapsing during operation under the weight of the glass passing through the opening between them. Located below baffles 58 and 59 is a baffle member 61 which is provided with two sidewalls 62 and 63. The baffle 61 is generally U-shaped with the side 62 and 63 being slanted towards the sides of the bushing. The baffle 61 is affixed to the baffles 58 and 59 by welded struts 64 which are affixed at intervals along the bottom of the baffle members 58 and 59 an the sides 62 and 63. Thus, the entire insert, including baffles 58, 59 and 61 can be simply dropped into the finished bushing 6 prior to bolting it to the bushing blocks that it will be associated with during operation. This provides for an easy assembly of inserting baffle arrangements below the bushing flange without requiring any welding to maintain them in the spacial relationships necessary to accomplish the objects of the invention. The baffles of the embodiments of FIGS. 1, 2, 3 and 4 can be assembled in the same manner so long as they are assembled as a unitary member with a flange that can rest on the bushing flange and provided vertical or sloped sides defining glass openings are stiffened as shown in FIG. 5 and the lower baffles are affixed to the upper baffles.

In operation of the various embodiments shown on the above drawings, the molten glass emanating from the forehearth and passing downwardly to the bushings, by virtue of the baffle arrangements contained within the bushings, can be successfully filtered of any stones contained therein. Thus, even though the baffles are quite small in length and height, they are of sufficient length and height to successfully remove refractory materials contained in the molten glass passing from the forehearth to a fiber forming bushing in a direct melt operation.

In FIG. 1, solid particles are collected in the corners of the upper baffles 13 and 14 as the glass is abruptly changed in its downward flow to an upward direction. As the glass passes over the extremeties 15 and 16 of the baffle member 12 further particles of glass are trapped from the glass column that passes directly to that baffle and the second glass stream which has already been turned from the upper baffles 13 and 14 into the opening 17.

In similar fashion, in the embodiment shown in FIG. 2, the refractory particles are collected on baffle members 23 and 24 and also on member 22 since it is at these points that the glass is forced inwardly and upwardly and outwardly and upwardly. The abrupt change in direction at these baffles coupled with the distance that the glass is forced to travel to go over the sides of the baffles is sufficient to trap the stones or particles present.

In the baffle arrangement of FIG. 3, glass particles are trapped in the baffle member 32 and the lower baffle members 35 and 36 by the abrupt change in direction of the glass flow caused by the interruption at the baffle surface that forces the glass to travel in a vertical direction to flow over the sides of those baffles. In FIG. 4, similarly the glass is trapped in baffle membr 40 and in the corners of baffle members 45 and 46 for the same reasons.

In connection with the baffling arrangements shown in the various embodiments of the invention described in the drawings, it is an important consideration to provide in any baffle that is resting against the sidewall of the bushing a plurality of small openings at intervals along the interface between the baffle and the sidewall of the bushing or baffle surface if inserts such as those used in FIG. 5 are employed. These openings are shown on baffles 14, 13, 24, 23, 32, 35, 36 and 40 and may be provided conveniently by cold punching holes in an upward direction along the baffle edge near the bushing wall to provide a series of escape routes for any gas bubbles that are in the glass immediately below the baffle. Similar holes, not shown, are provided along wall 53 of FIG. 5 where it joins baffle 58. These serve as a pressure relief zones for such gas bubble escape.

It is also an important consideration in the construction of baffle arrangements so that they can be readily inserted into bushings without welding them to the surfaces of the bushing per se that the lower baffle be attached to the upper baffle utilizing a series of struts, not shown in the drawings of FIGS. 1-4, which can be spaced at intervals along the length of the lower baffle and the bottom of the upper baffle. One such strut is shown in FIG. 5 but it would be understood that along the length of the lower baffle and the bottom of the upper baffle in FIG. 5 a plurality of these struts would be employed. It is also an important consideration in constructing these baffles that the glass flow openings should be provided with stiffening members at spaced intervals along the baffle sides forming the opening to provide mechanical integrity to the baffle sides and prevent them from bending in an inward or downward direction due to the weight of the glass. As shown in the drawings in FIGS. 1, 2, 3 and 4, the baffle members are shown for purposes of clarity. It will be understood, however, that the baffle arrangements as shown can be adapted to be used as inserts as in FIG. 5 in which case the lower baffle is connected to the upper baffles using struts as mentioned and that sidewalls would be provided for the baffle assembly. In the preferred embodiment, the baffle members are not directly affixed to the bushing sidewall, but if desired they can be directly welded to the bushing walls. While they can be affixed by welding to the sidewall as previously stated, this is not as desirable as having them set in the bushing as an unwelded insert.

While the invention has been described with reference to certain specific examples and specific embodiments as illustrated in the accompanying drawings, it is of course not intended that the invention be limited, thereby acceptance so far as appears in the accompanying claims.

I claim:

1. In the formation of glass fibers comprising feeding molten glass fromm a forehearth to a bushing having a plurality of nozzles or tips through which the glass flows to form the fibers the improvement comprising feeding a stream of molten glass downwardly from the forehearth to the bushing, dividing the downwardly flowing stream into two components, passing one of the components to a baffle surface and causing the glass in that stream to abruptly change directions so that it flows in a upward direction for a height and distance sufficient to cause dense solids contained therein to settle at the baffle surface, changing the direction of the upwardly flowing glass to a downward flow with the other downwardly flowing stream and causing that resulting stream of downwardly flowing glass to be passed to a second baffle surface, passing the glass from the second baffle surface upwardly for a distance sufficient to cause any dense solid contaminants therein to settle on said baffle surface and redirecting the glass downwardly to the bushing nozzles and passing the glass through the nozzles to form glass fibers.

2. The method of claim 1 wherein the glass flowing to the first baffle surface is divided so that the glass passing along the side walls of the bushing passes directly to the second baffle surface and the glass passing down the central portion of the bushing is passed to the first baffle surface.

3. The method of claim 1 wherein the glass flowing to the first baffle surface is the glass passing down the sides of the bushing and the glass passing to the second baffle surface is the glass passing down the central portion of the bushing.

4. A fiber glass forming bushing comprising an electrically heated container having four sides and a bottom, a plurality of tips on the bottom communicating with the interior of the container and through which molten glass may flow, a flange around the sides of the container at the top of the sides, means to attach the bushing to a forehearth opening, an elongated first baffle inclined upwardly from all sides of the bushing toward the center and defining an opening in the central portion of the bushing interior for the admission of molten glass therethrough, a second baffle member below said first baffle and spaced therefrom, said second baffle member having sidewalls sloped upwardly to a point adjacent to but below said first baffle to thereby define a narrow passage between the first baffle and the sides of said second baffle which communicates with the bottom of said container and means to maintain said first and second baffles spaced from each other as molten glass passes over their surfaces, and both baffles being positioned below the bushing flange.

5. The bushing of claim 4 wherein the second baffle is elongated and defines an area below the opening in said first baffle which is greater than the area of said opening.

6. The bushing of claim 5 wherein the second baffle is attached to the first baffle by struts placed at spaced intervals along the length of the base of said first baffle and the upper sides of said second baffle.

7. The bushing of claim 4 wherein the opening in said first baffle is supported from vertical deflection by a series of bracing members spaced from each other along the length of the opening, said bracing members affixed to the walls of the baffle.

8. The bushing of claim 4 wherein the first baffle member is supported along the sides and length of the bushing opening by a wall member and a peripheral flange associated with said wall, the flange on the baffle member being adapted to rest on the bushing flange and position the first baffle below the bushing flange in the vertical plane.

9. A fiber glass forming bushing comprising an electrically heated container having four sides and a bottom, a plurality of tips on the bottom communicating with the interior of the container and adapted to pass molten glass therethrough, a flange around the sides of the container at the top thereof, means to attach the bushing to a forehearth opening, an elongated U-shaped baffle having the sides inclined upwardly away from the bottom of the bushing defining an opening in the central portion of the bushing interior for the admission of molten glass therethrough, a second baffle member located below said first baffle and spaced therefrom, said second baffle member having sidewalls spaced inwardly from the bushing sides parallel to the floor of said first baffle member and defining a central opening between in the center portion of the baffle member in communication with the bushing bottom, the central opening of the wall of the second baffle member on the floor of the first baffle member forming a narrow opening for the passage of glass from the sides of the bushing towards the center both said baffles being positioned below the bushing flange and means to maintain the baffles spaced from each other as glass contacts their surfaces.

10. The bushing of claim 9 wherein the second baffle defines a central opening which is narrower than the width of the floor of the first baffle member.

11. The bushing of claim 9 wherein the second baffle is attached to the first baffle by struts placed at spaced intervals along the length of the surface of the second baffle member defining the opening and the base of said first baffle.

12. The baffle member of claim 9 wherein the opening in said first baffle is supported from vertical deflection by a series of brace members spaced from each other along the length of the opening defined by said baffle, said brace members being fixed to the walls of the baffle.

13. The bushing of claim 9 wherein the second baffle is supported along the sides and length of the bushing opening by wall members and a peripheral flange associated with said walls, the flange on the baffle member being adapted to rest on the bushing flange and position the first and second baffles below the bushing flange in the vertical plane when placed on the bushing flange.

* * * * *